United States Patent
Lightstone et al.

(10) Patent No.: US 7,281,004 B2
(45) Date of Patent: Oct. 9, 2007

(54) METHOD, SYSTEM AND PROGRAM FOR OPTIMIZING COMPRESSION OF A WORKLOAD PROCESSED BY A DATABASE MANAGEMENT SYSTEM

(75) Inventors: Sam S. Lightstone, Toronto (CA); Guy M. Lohman, San Jose, CA (US); Ivan Popivanov, Markham (CA); Jun Rao, San Jose, CA (US); Adam J. Storm, Toronto (CA); Daniele C. Zilio, Georgetown (CA)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 10/788,583

(22) Filed: Feb. 27, 2004

(65) Prior Publication Data

US 2005/0192978 A1 Sep. 1, 2005

(51) Int. Cl.
*G06F 17/30* (2006.01)
(52) U.S. Cl. ........................................................ 707/4
(58) Field of Classification Search .................... 707/1, 707/2, 4, 10, 200, 101; 709/224, 217
See application file for complete search history.

(56) References Cited

U.S. PATENT DOCUMENTS

| 5,761,653 | A | 6/1998 | Schiefer et al. ................. 707/2 |
| 5,875,445 | A | 2/1999 | Antonshenkov ................ 707/2 |
| 5,960,423 | A | 9/1999 | Chaudhuri et al. ............. 707/2 |
| 5,960,428 | A * | 9/1999 | Lindsay et al. ................. 707/4 |
| 6,108,647 | A | 8/2000 | Poosala et al. ................. 707/1 |
| 6,363,371 | B1 | 3/2002 | Chaudhuri et al. ............. 707/2 |
| 6,397,207 | B1 * | 5/2002 | Bleizeffer et al. .............. 707/2 |
| 6,513,029 | B1 | 1/2003 | Agrawal et al. ................ 707/2 |
| 6,529,901 | B1 | 3/2003 | Chaudhuri et al. ............. 707/3 |
| 2003/0065648 | A1 | 4/2003 | Driesch, Jr. et al. ............ 707/2 |
| 2004/0003004 | A1 * | 1/2004 | Chaudhuri et al. ......... 707/200 |

OTHER PUBLICATIONS

Chaudhuri, et al., *Compressing SQL Workloads*, ACM SIGMOD, Jun. 4-6, 2002, Madison, Wisconsin, USA, pp. 488-496.
Chaudhuri, et al., *An Efficient, Cost-Driven Index Selection Tool for Microsoft SQL Server*, Procedings of the 23rd VLDB Conf. Athens, Greece, 1997.
Chaudhuri, et al., *AutoAdmin "What-if" Index Analysis Utility*, ACM SIGMOD Conf. 1998, pp. 367-378.

* cited by examiner

*Primary Examiner*—Etienne Leroux
(74) *Attorney, Agent, or Firm*—Kunzler & McKenzie (57) ABSTRACT

The present invention provides a method, system and program for optimizing compression of a workload processed by a database management system. In an embodiment of the present invention a method of optimizing the compression of database workloads is provided. Initially, an estimate of a cost of execution for each query according to a defined metric such as execution time or memory consumption is determined. A sub-set of queries is then selected from the workload in order of the most costly to least costly relative to the defined metric for compression according to either a predetermined compression threshold percentage or a threshold percentage derived from an allotted workload execution time. Compression is then performed on the selected sub-set of queries (i.e. those that will benefit the most from the compression) to achieve a net beneficial trade-off between the cost of workload compression and the cost of workload execution.

13 Claims, 6 Drawing Sheets

METHOD, SYSTEM AND PROGRAM FOR OPTIMIZING COMPRESSION OF A WORKLOAD PROCESSED BY A DATABASE MANAGEMENT SYSTEM

FIELD OF INVENTION

The present invention relates to the field of database management systems and more particularly to a method, system and computer program product for optimizing compression of a workload to be processed by a database management system.

BACKGROUND

To access the data contained in databases, such as an SQL (structured query language) database, queries or statements are used by a database management system (DBMS). A collection of these queries, which are to be executed by the DBMS is defined as a workload. The computational complexity or cost of execution of a workload in terms of metrics such as time required for execution or resources required for execution, such as memory, grows geometrically or even exponentially with the complexity or size (e.g. number of queries) of the workload. For example, the execution of a hundred queries can be four orders of magnitude more expensive in terms of required execution time than a single query. Therefore, it is relatively more costly to execute a complex workload with multiple queries rather than executing multiple simple workloads with fewer queries. In order to reduce the cost of executing a workload based upon metrics such as, for example, execution time, compression techniques have been developed for compressing workloads by reducing a large set of queries to a smaller set of queries which adequately represent the overall workload. Typically, the more complex a query in a workload is, (i.e. the higher execution cost) the more benefit will be obtained by compression of the query. However, the benefit gained by compressing a workload can be negated by the overall cost and resources required to compress the workload itself.

Therefore, there is a need for a method, system and computer program product that balances the cost of workload compression versus the cost of workload execution.

SUMMARY

The present invention provides a method, system and computer program product for optimizing compression of database workloads processed by a database management system. The queries within the workload that constitute the most costly to execute, in terms of a metric such as, for example, execution time, I/O usage, CPU utilization, memory consumption or throughput contribution per query, etc., that would benefit the most from compression, are chosen according to either a selected compression threshold percentage or alternatively according to a compression threshold percentage required to enable execution of the workload within a given execution time. Therefore, a net beneficial trade-off between the cost of workload compression versus the cost of workload execution can be achieved through optimizing workload compression by using compression threshold percentages to select a sub-set of queries that will benefit the most from compression.

In accordance with one aspect of the present invention, there is provided, for a database management system to be operatively coupled to a data processing system, a method for optimizing compression of a workload comprising a plurality of queries, the method comprising: estimating a cost to execute the queries; selecting a sub-set of queries from the workload according to a threshold level, the threshold level being a function of the estimated cost to execute the queries; and compressing the selected sub-set of queries.

In accordance with another aspect of the present invention, there is provided for a database management system to be operatively coupled to a data processing system, a computer program product comprising a computer readable medium tangibly embodying computer executable code for optimizing compression of a workload comprising a plurality of queries, the computer programmed product further comprising: code for estimating a cost to execute the queries; code for selecting a sub-set of queries from the workload according to a threshold level, the threshold level being a function of the estimated cost to execute the queries; and code for compressing the selected sub-set of queries.

In accordance with yet another aspect of the present invention, there is provided for a database management system to be operatively coupled to a data processing system, a workload compression system for optimizing compression of a workload comprising a plurality of queries, the workload compression system comprising: means for estimating a cost to execute the queries; means for selecting a sub-set of queries from the workload according to a threshold level, the threshold level being a function of an estimated cost to execute the queries; and means for compressing the selected sub-set of queries.

BRIEF DESCRIPTION OF DRAWINGS

A better understanding of these and other embodiments of the present invention can be obtained with reference to the following drawings and detailed description of the preferred embodiments, in which.

DETAILED DESCRIPTION OF THE EMBODIMENTS

The following detailed description of the embodiments of the present invention does not limit the implementation of the embodiments to any particular computer programming language. The computer program product may be implemented in any computer programming language provided that the OS (Operating System) provides the facilities that may support the requirements of the computer program product. A preferred embodiment is implemented in the C or C++ computer programming language (or may be implemented in other computer programming languages in conjunction with C/C++). Any limitations presented would be a result of a particular type of operating system, computer programming language or data processing system and would not be a limitation of the embodiments described herein.

Database workload compression provides the ability to take a large workload containing a large set of queries and reduce it to a smaller set of queries which adequately represents the large set. A goal of workload compression is the ability to execute the workload in a shorter execution time or for a smaller execution cost compared to the uncompressed workload yet achieve substantially the same result. However, the process of compressing a workload also incurs a cost of execution by the database management system in analysing and compressing the workload prior to the actual execution of the workload itself, thus adding to the total cost of execution. Therefore, it is advantageous to optimize the workload compression to provide the most gain in terms of total execution cost by taking into consideration the analysis cost, compression cost and the actual workload execution cost.

An embodiment of the present invention provides a method of optimizing the compression of database workloads in general terms as follows. Initially, an estimate of a cost of execution for each query according to a defined metric such as execution time or memory consumption is determined. A sub-set of queries is then selected from the workload in order of the most costly to least costly relative to the defined metric for compression according to either a predetermined compression threshold percentage or a threshold percentage derived from an allotted workload execution time. Compression is then performed on the selected sub-set of queries (i.e. those that will benefit the most from the compression) to achieve a net beneficial trade-off between the cost of workload compression and the cost of workload execution.

Figure 1:
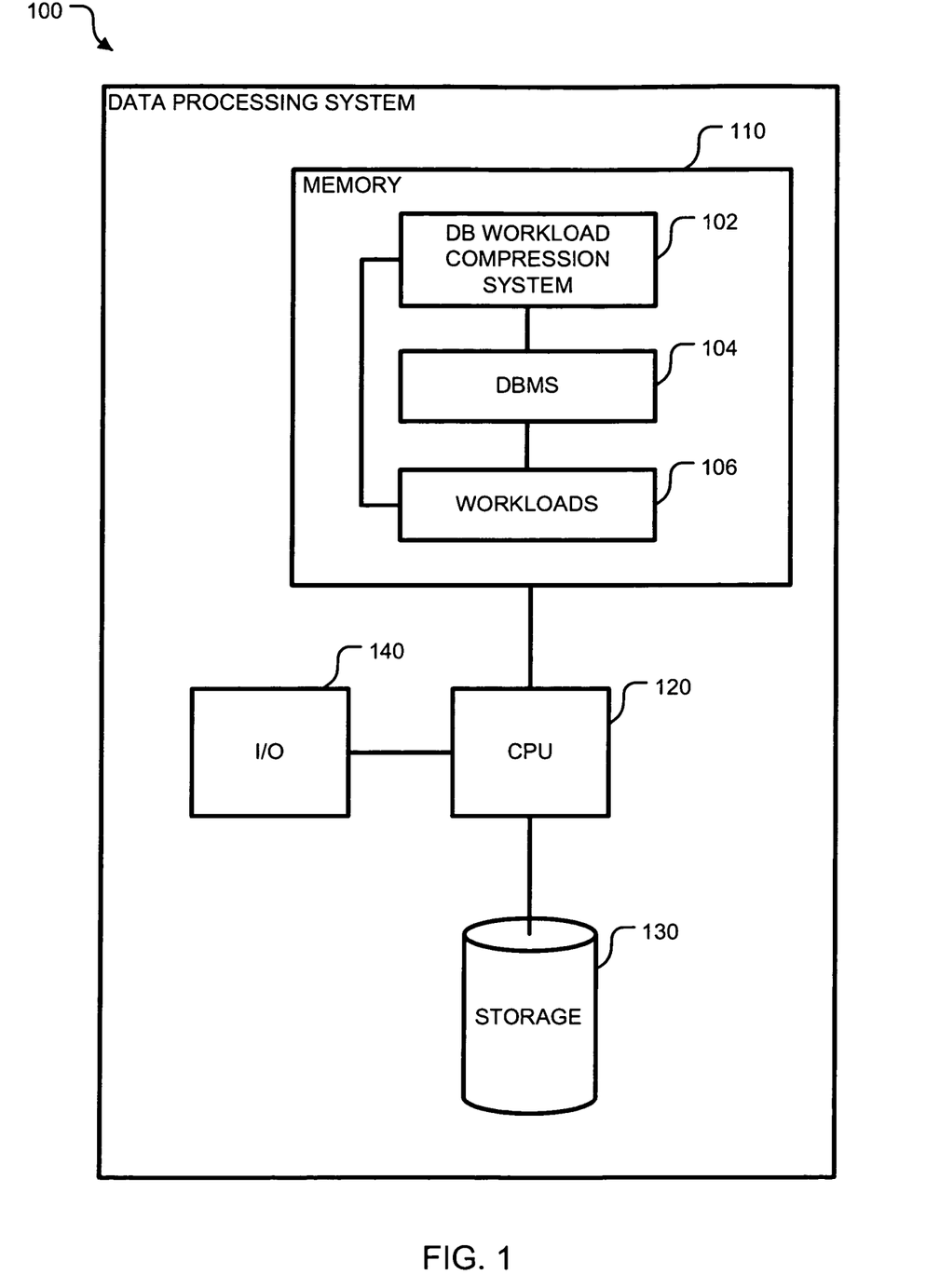
FIG. 1 is a diagram of a workload compression system for compressing workloads processed by a database management system.

FIG. 1 shows an exemplary embodiment of a workload compression system 102 for compressing a workload 106 to be then subsequently processed by a database management system (DBMS) 104. The workload compression system 102 includes computer executable code which is tangibly embodied in memory 110 of a data processing system 100. The computer executable instructions were previously compiled by a code compiler from high level computer programmed instructions written in a high level computer programming language. The hardware elements of the data processing system 100 support and execute the computer executable code included in the workload compression system 102. The data processing system 100 includes a central processing unit (CPU) 120 that provides main processing functionality. A memory 110 is coupled to CPU 120 for providing operational storage of programs and data.

Memory 110 may comprise, for example, random access memory (RAM) or read only memory (ROM). Non-volatile storage of, for example, data files and programs is provided by storage 130 that may comprise, for example, disk storage. Both memory 110 and storage 130 comprise a computer useable medium that may store computer program products in the form of computer readable program code.

User input and output is provided by an input/output (I/O) facility 140. The I/O facility 140 may include, for example, a graphical display, a mouse and/or a keyboard.

Figure 2:
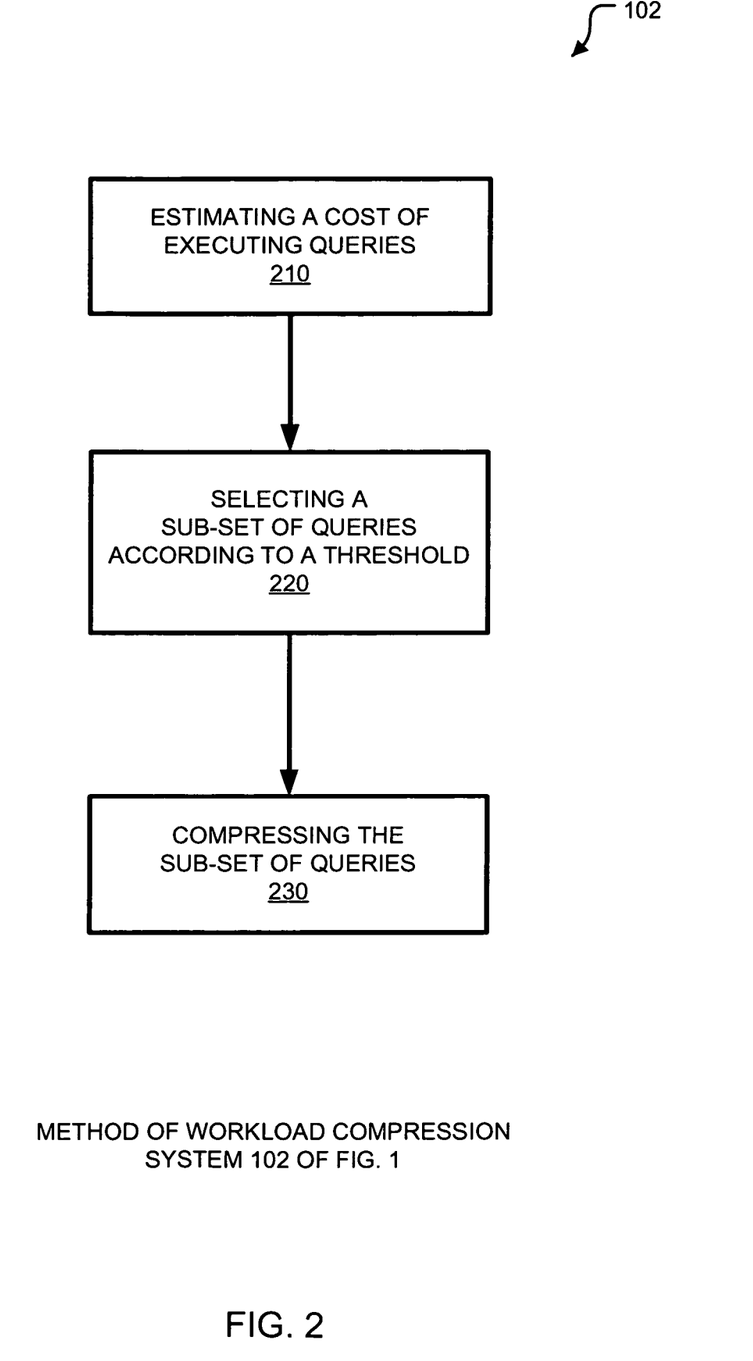
FIG. 2 is a flow diagram showing operations in an exemplary embodiment of a method according to the present invention that can be implemented in the workload compression system of FIG. 1.

FIG. 2 is a flow diagram showing operations in an exemplary embodiment of a method according to the present invention that can be implemented in the workload compression system of FIG. 1. At step 210 estimation of a cost of execution of the queries of the workload is performed. The estimated cost of executing each query can be determined using metrics such as, for example, execution time, I/O usage, CPU utilization, memory consumption or throughput contribution per query, etc. In addition, the amount of time required to obtain each query's estimated execution cost (i.e. compile time) is also determined. The estimated cost may also include a weighting factor assigned to individual queries or query types. The weighting factor may also be based upon analysis of query frequency within the workload or characteristics derived from analysis of the workload by the DBMS. Step 210 can be performed by a database query optimizer which takes a single query as input in addition to the estimated execution time and other metrics including the weighting factor, and returns a plan of execution for the given query.

Once an estimated cost of execution has been associated with each query, selection of a sub-set of queries to be compressed is performed at step 220. Selection involves the determination of the queries for which compression will be the most beneficial according to a predetermined compression threshold. The compression threshold can be preselected, and can represent for example compression of the most costly 60% of the queries relative to the total workload execution cost. Alternatively, the compression threshold can be determined in terms of an execution time allotted for execution of the workload. In an alternative embodiment, if the estimated execution time for a workload exceeds a total allotted execution time, a compression threshold is determined to ensure that sufficient queries are compressed in order to successful execute the workload in the allotted time as described below in relation to FIG. 5.

Figure 3A:
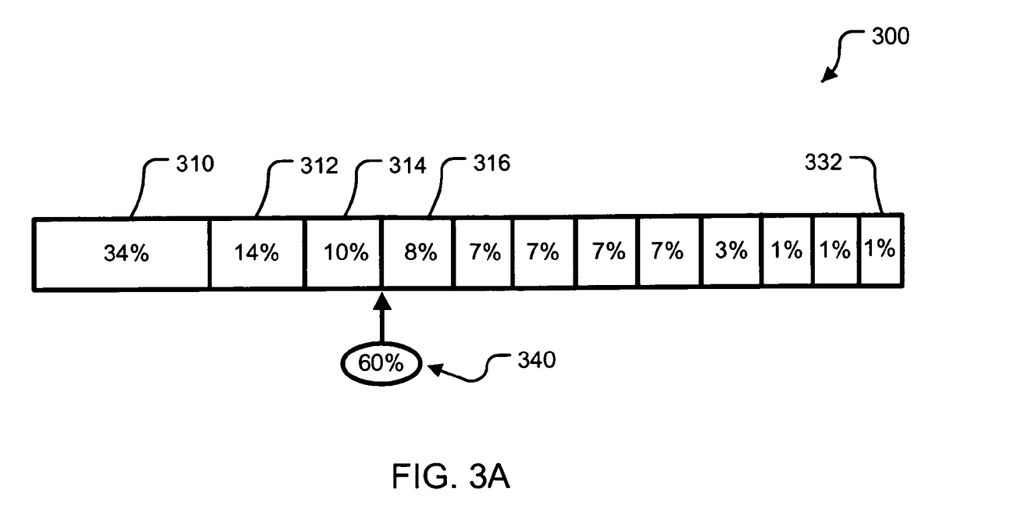
FIGS. 3A & 3B are representations of threshold selection of a sub-set of queries to be compressed by the workload compression system of FIG. 1.

FIG. 3A is a representation of a working example to be processed by the workload compression system 102 of FIG. 1. In particular, a depiction of the selection of a sub-set of queries for compression according to step 120 is illustrated. A workload 300 consists of 12 queries that are sorted in terms of the most costly (i.e. expensive) such as query 310 to least costly (i.e. less-expensive) such as query 332 relative to the defined metric (a sub-set of queries designated 312, 314 and 316 are also shown). For example, query 310 requires an estimated 34% of the total workload execution time while query 332 only requires an estimated 1% of the total workload execution cost. A benefit from compression will typically occur with the most complex or most costly queries. Therefore, by ordering the queries by execution cost, the most costly queries can be selected for compression relative to the compression threshold.

In the example of FIG. 3A, a compression threshold 340 of 60% is selected. The determination of the sub-set in accordance with the threshold 340 is dependent on the cost improvement to be obtained such as compression of the sub-set of queries representing 60% of the total workload. The compression threshold 340 results in selection of a sub-set of queries (310, 312, 314) for compression. Referring again to FIG. 2, at step 230, the selected sub-set of queries (310, 312, 314) are then compressed using know workload compression techniques. Therefore, the final workload after compression would consist of compressed queries 310, 312 and 314 with the remaining queries uncompressed. At the completion of the method 102, the most costly queries are compressed (i.e. the ones that will achieve the most benefit from compression) to obtain an overall improvement in workload execution cost while limiting the amount of resources spent in compression of the least costly queries.

In alternative embodiments of the present invention, optimizing workload compression to reduce overall workload execution cost may be refined in situations where certain types of queries do not necessarily benefit the equally from compression. When objects are added to a database, some query types experience an increased execution cost that is linearly proportional to the increased number of objects in the database. While other query types experience a greater than linear (e.g. exponential) increase in execution cost. For example, in SQL databases, queries such as "UPDATE/DELETE/INSERT" experience greater than linear increases in execution cost while "SELECT" queries experience linear increases in execution cost when additional objects are added to the database. As a result, selecting queries for compression without regard for their type, the optimization benefit of compression may not be achieved in a case where objects are added to the database. In an alternative embodiment of the method of the present invention, the workload is divided into query groups based upon query type, and a compression threshold is applied to each of the query groups.

Figure 3B:
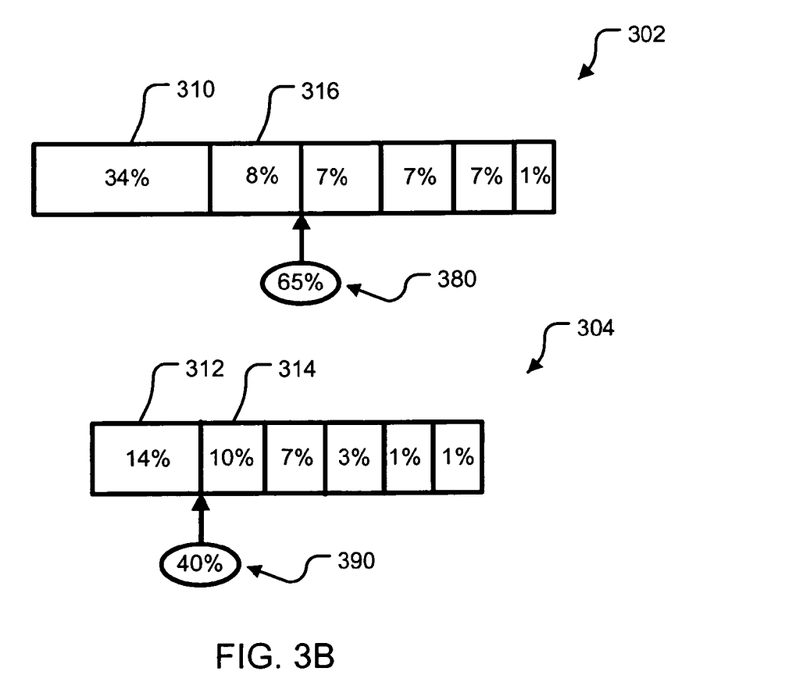

The method 102 can be applied to the full workload, as well as to any subset of queries in the workload which is useful when considering queries with different compression characteristics. Unique compression thresholds can then be tailored to each of the query groups to achieve optimal overall execution cost. For example, the twelve queries shown in FIG. 3A, can be sub-divided into two separate query groups based upon the type of queries represented. FIG. 3B represents division of the 12 queries represented in FIG. 3A in two groups 302 and 304. For example, 302 may represent "UPDATE/DELETE/INSERT" type queries while 304 may represent "SELECT" type queries. For group 302, if a compression threshold 380 of 65% is selected, compression will be applied to the first two queries 310 and 316. For group 304, if a compression threshold 390 of 40% is selected, compression will be applied to query 312, leaving query 314 uncompressed. When the queries in the workload are divided into groups according to query types, the queries that are compressed may not necessarily be the same as the queries compressed when optimization is applied to the entire workload to a single compression threshold.

Figure 4:
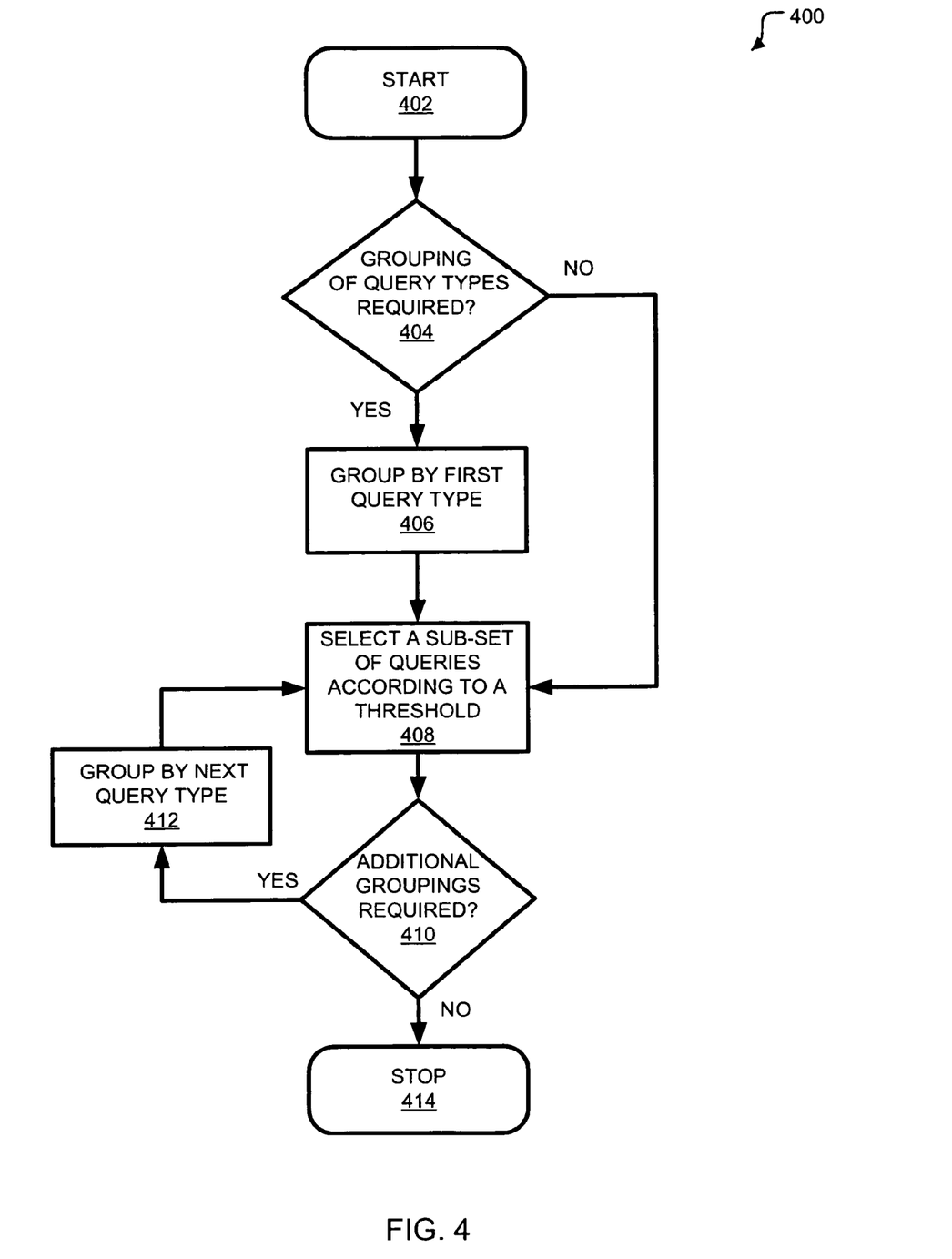
FIG. 4 is a flow diagram showing sub-steps in a method according to the present invention for grouping queries by query type.

FIG. 4 is a flow diagram showing sub-steps for step 220 in accordance with an alternative embodiment of method 102 for grouping queries by query type. Execution of sub-steps 400 commences at 402. Next, the determination of whether the queries of the workload are to be grouped or subdivided by query types within the workload 404. Selection of the group types may be predetermined as a user defined parameter or based upon workload analysis by the DBMS. If all of the queries are selected (NO at 404), then a sub-set of queries are selected according to a selected compression threshold 408 as described above in relation to FIG. 3A. If however, the workload is to be grouped by types (YES at 404) a grouping of all queries of a first type is performed 406. A sub-set of queries is then selected according to a threshold (in the same manner discussed previously) which may be unique for a particular query type 408. It is then determined if additional query groupings are required 410. If there are additional types (YES at 410), then another grouping is performed based upon the next query type 412. Again, a sub-set of queries is again selected according to a threshold which may be unique for a particular query type 408. If there are no additional query groups (NO at 410) the method is completed 414.

Figure 5A:
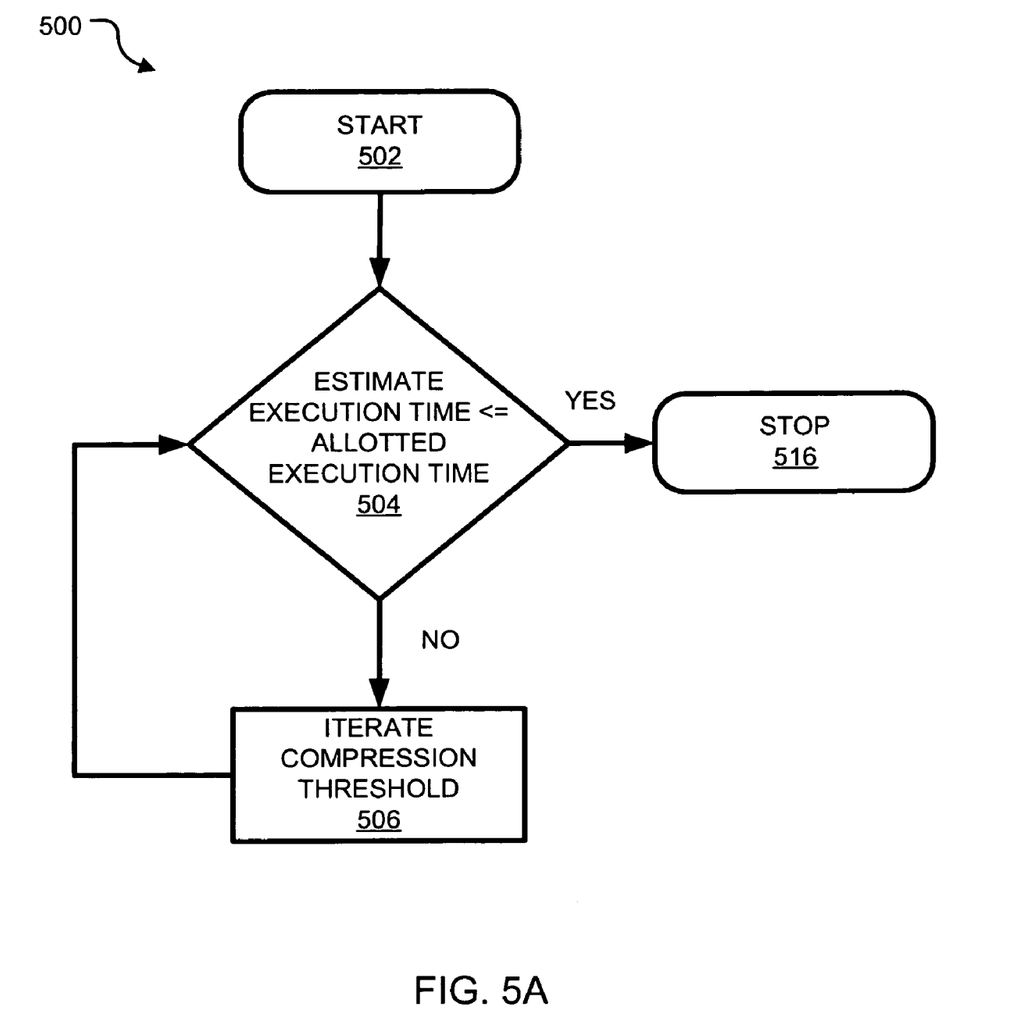
FIGS. 5A & 5B are flow diagrams showing sub-steps in a method according to the present invention for selecting a compression threshold according to an allotted execution time for a sub-set of queries Similar references are used in different figures to denote similar components.

FIG. 5A shows sub-steps in the method according to the present invention in accordance with an alternative embodiment of step 220 where an estimated execution time threshold is provided in order to determine a workload compression threshold. Execution of sub-steps 500 commences at 502. If the estimated execution time of the workload is within the allotted execution time (YES at 504) then no workload compression is required and the method is completed 516. However, if the estimated execution time is not within the allotted execution time, meaning compression is required, (NO at step 504) a compression threshold percentage will be determined through iterative query selection and compression. The compression threshold is iterated between step 506 and 504 until the estimated execution time of the workload is less than or equal to the allotted execution time, to a desired compression percentage accuracy or until an allotted iteration execution time has been met at step 504.

Figure 5B:
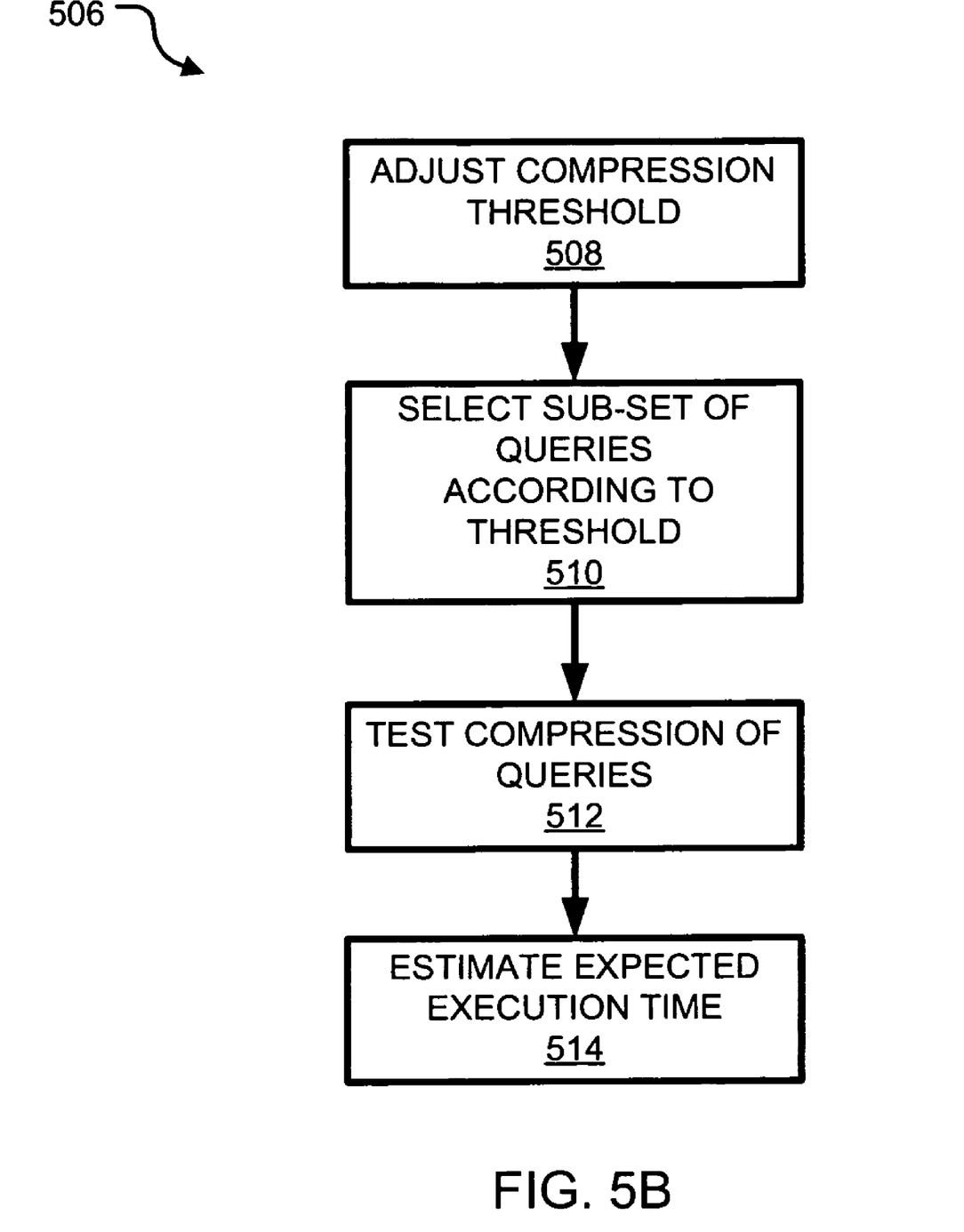

FIG. 5B is an exemplary embodiment of an iterative implementation of determining an optimal compression threshold percentage at step 506. For the first iteration an initial threshold percentage, such as 50% compression is selected at step 508. The sub-set of queries according to the threshold is selected 510. A test compression is performed on the queries 512 and an estimate is made of the expected execution time of the compressed workload 514. The estimation of the expected execution time of the compressed workload can be derived by the amount of time required to obtain each query's estimated execution cost (i.e. compile time) as determined at step 210. Depending on whether the estimated expected execution time is greater or less than the allotted execution time (which can be determined at step 504 of FIG. 5A) the compression threshold interval is reduced by a factor of two, for example either 25% or 75% respectively. The compression threshold is then adjusted by successive approximation until the optimal compression percentage is obtained. The optimal compression may be determined relative to a limit on the resolution of the compression percentage or terminated when a time limit allotted for the number of iterations is met. In the later case, the last compression threshold that enables execution with the allotted time is selected. Referring back to FIG. 5A, once an optimal compression threshold has been determined, where estimated execution time of the workload is less than or equal to the allotted execution time (YES at 504), the method terminates 516.

It will be appreciated that variations of some elements are possible to adapt the invention for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

The invention claimed is:

1. A computer-implemented method for optimizing compression of a workload comprising a plurality of queries, the computer-implemented method comprising:

estimating a cost to execute each query within a plurality of queries of a workload;

automatically selecting a sub-set of queries from the workload, the sub-set of queries comprising one or more queries from the workload that together have a total estimated cost of execution less than or equal to a threshold level, the threshold level comprising a percentage of the total estimated cost to execute all the queries of the workload, the percentage comprising between about 40% and about 65%, wherein the queries of the workload are in decreasing rank order based on an estimated cost of execution for each query and selection of the sub-set of queries examines queries in the rank order from the higher estimated cost of execution toward the lower estimated cost of execution; and compressing the selected sub-set of queries.

2. The computer-implemented method of claim 1 wherein the cost of execution is a function of a parameter selected from the group consisting of estimated execution time of each query, amount of computer memory required for execution of each query, amount of I/O usage required for execution of each query, amount of CPU utilization required for execution of each query, and throughput contribution required for execution of each query and combination thereof.

3. The computer-implemented method of claim 2 wherein the cost of execution is a function of one or more of:
   a frequency/weighting component associated with each query;
   an estimated time of execution for each query;
   an amount of computer memory required for execution of each query;
   an amount of I/O usage required for execution of each query;
   an amount of CPU utilization required for execution of each query; and
   an amount of throughput contribution required for execution of each query.

4. The computer-implemented method of claim 1 wherein the threshold is derived from one or more of:
   a percentage of a total execution time of the workload;
   an allotted execution time for the workload;
   a determination made by applying successive approximation techniques; and
   a determination made when an allotted threshold selection time has been reached.

5. The computer-implemented method of claim 1 wherein selecting further comprises sub-dividing the plurality of queries into groups of queries based upon query types wherein the threshold applied to a group of queries is a percentage of a total estimated cost of execution for the group of queries.

6. The computer-implemented method of claim 5 wherein the threshold applied to a group of queries is derived from an allotted execution time for the group of queries.

7. A computer program product comprising a computer readable medium tangibly embodying computer executable code for optimizing compression of a workload comprising a plurality of queries, the computer programmed product comprising:
   code estimating a cost to execute each query within a plurality of the queries of a workload;
   code for automatically selecting a sub-set of queries from the workload, the sub-set of queries comprising one or more queries from the workload that together have a total estimated cost of execution less than or equal to a threshold level, the threshold level comprising a percentage of the total estimated cost to execute all the queries of the workload, the percentage comprising between about 40% and about 65%, wherein the queries of the workload are in decreasing rank order based on an estimated cost of execution for each query and selection of the sub-set of queries examines queries in the rank order from the higher estimated cost of execution toward the lower estimated cost of execution;
   wherein the cost of execution is a function of one or more of:
      a frequency/weighting component associated with each query;
      an estimated time of execution for each query;
      an amount of computer memory required for execution of a query;
      an amount of I/O usage required for execution of a query;
      an amount of CPU utilization required for execution of a query; and
      an amount of throughput contribution required for execution of a query; and
   code for compressing the selected sub-set of queries.

8. The computer programmed product of claim 7 wherein the threshold is derived from one or more of:
   a percentage of a total execution time of the workload;
   an allotted execution time for the workload;
   a determination made by applying successive approximation techniques; and
   a determination made when an allotted threshold selection time has been reached.

9. The computer programmed product of claim 7 wherein the step of selecting further comprising sub-dividing the plurality of queries into groups of queries based upon query types wherein the threshold applied to a group of queries is a percentage of a total estimated cost of execution for the group of queries.

10. The computer programmed product of claim 9 wherein the threshold applied to a group of queries is derived from an allotted execution time for the group of queries.

11. For a database management system to be operatively coupled to a data processing system, a workload compression system for optimizing compression of a workload comprising a plurality of queries, the workload compression system comprising:
   means for estimating a cost to execute each query within a plurality of the queries of a workload;
   means for automatically selecting a sub-set of queries from the workload, the sub-set of queries comprising one or more queries from the workload that together have a total estimated cost of execution less than or equal to a threshold level, the threshold level comprising a percentage of the total estimated cost to execute all the queries of the workload, the percentage comprising between about 40% and about 65%, wherein the queries of the workload are in decreasing rank order based on an estimated cost of execution for each query and selection of the sub-set of queries examines queries in the rank order from the higher estimated cost of execution toward the lower estimated cost of execution;
   wherein selecting comprises sub-dividing the plurality of queries into groups of queries based upon query types wherein the threshold applied to a group of queries is a percentage of a total estimated cost of execution for the group of queries;
   wherein the cost of execution is a function of one or more of:
      a frequency/weighting component associated with each query;
      an estimated time of execution for each query;
      an amount of computer memory required for execution of each query;

an amount of I/O usage required for execution of each query;

an amount of CPU utilization required for execution of each query; and an amount of throughput contribution required for execution of each query and means for compressing the selected sub-set of queries.

12. The workload compression system of claim 11 wherein the threshold is derived from one or more of:

a percentage of a total execution time of the workload;

an allotted execution time for the workload;

a determination made by applying successive approximation techniques; and a determination made when an allotted threshold selection time has been reached.

13. The workload compression system of claim 11 wherein the threshold applied to a group of queries is derived from an allotted execution time for the group of queries.

* * * * *